United States Patent Office 3,271,365
Patented Sept. 6, 1966

3,271,365
POLYESTERS OF DECAHYDRONAPHTHALENEDI-CARBOXYLIC ACID AND DIHYDRIC PHENOLS
Fred M. Parham, Kinston, N.C., assignor to E. I. du Pont de Nemours and Company, Wilmington, Del., a corporation of Delaware
No Drawing. Filed Nov. 5, 1962, Ser. No. 236,152
9 Claims. (Cl. 260—47)

This invention relates to a novel class of moldable linear polyesters, as well as to fibers, films, and other shaped articles produced therefrom. More particularly, the invention is concerned with such products characterized by the presence of recurring units of an esterified decahydronaphthalenedicarboxylic acid, i.e.

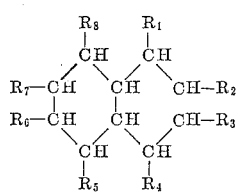

wherein two of the R substituents are —COOH and the remainder are hydrogen.

The novel polyesters of this invention are linear condensation polymers prepared by reacting dihydroxy compounds containing from 4 to 20 carbon atoms and including at least one carbocyclic nucleus, or ester-forming derivatives of the dihydroxy compounds with a decahydronaphthalenedicarboxylic acid as defined above, or an ester-forming derivative thereof. The dihydroxy compound is free from aliphatic unsaturation and, preferably, is a dihydric phenol. The polyester products are useful in the preparation of tenacious fibers and films as well as other shaped articles. They are also generally characterized by good stability to light, both outdoors and indoors.

The decahydronaphthalenedicarboxylic acids are readily obtained via reduction of the corresponding naphthalenedicarboxylic acids or esters thereof with hydrogen in the presence of platinum oxide or ruthenium as a catalyst. The process is applicable to each of the ten position isomers of naphthalenedicarboxylic acid. Each of the position isomers obtained by complete reduction of the starting material naphthalenedicarboxylic acid in this way is actually found to consist of a mixture of various geometrical isomers, i.e., compounds having the same carbon skeleton but occurring in various cis- and trans-forms. For the purpose of the present invention, such mixtures can be employed as the direct starting materials for the preparation of polyesters, or specific geometrical isomers can be isolated and used as starting materials. The mixtures of acids can also be treated in such a way as to alter the ratio of the various isomers contained therein.

Preferably, the linear polyesters of the present invention are esters of decahydronaphthalene dicarboxylic acids in which the carboxyl groups are separated by a chain of at least four nuclear alicyclic carbon atoms. These acids are the decahydro-1,7-, 1,6-, 1,5-, 1,4-, 2,7-, and 2,6-naphthalenedicarboxylic acids. The latter four, which are symmetrically substituted as illustrated by the formulas below, are especially preferred, decahydro-2,6-naphthalenedicarboxylic acid being the one which provides the best polyester fiber properties.

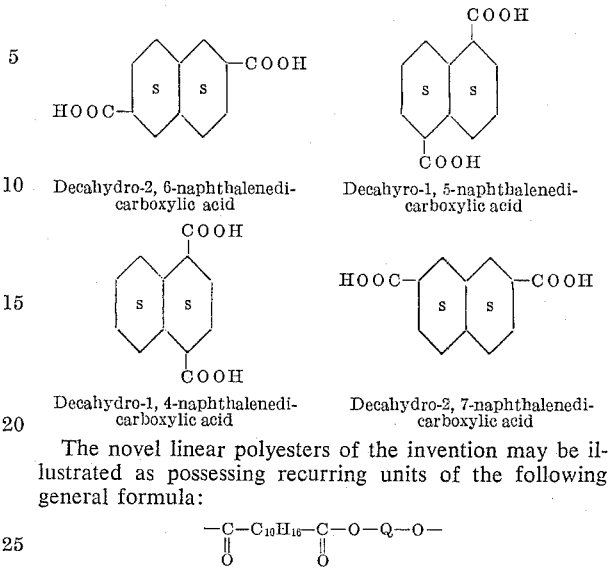

Decahydro-2,6-naphthalenedicarboxylic acid

Decahyro-1,5-naphthalenedicarboxylic acid

Decahydro-1,4-naphthalenedicarboxylic acid

Decahydro-2,7-naphthalenedicarboxylic acid

The novel linear polyesters of the invention may be illustrated as possessing recurring units of the following general formula:

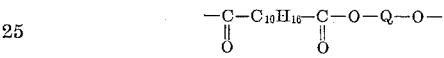

in which Q is a divalent organic radical containing from 4 to 20 carbon atoms and including at least one carbocyclic nucleus. Thus, Q may be an arylene, aralkylene, or cycloalkylene radical of 4 to 20 carbon atoms derived from a dihydroxy compound of the formula $Q(OH)_2$; i.e., either a cyclic glycol or, preferably, a dihydric phenol. Ester-forming derivatives of the dihydroxy compound, i.e., compounds containing functional groups equivalent to the hydroxyl group in their ability to react with the carboxyl group, such as epoxides or esters of the dihydroxy compound, may also be used. Particularly useful are the acetate ester or esters or other aliphatic acids having relatively few carbon atoms.

Suitable cycloalkylene glycols which may be employed include 1,3-cyclobutanediol, 1.3-cyclopentanediol, quinitol, 1,3 - cyclopentanedimethanol, hexahydro - p - xylene glycol, 1,1-bis(hydroxymethyl)cyclohexane, 4,4'-bicyclohexyldimethanol, bis(4 - hydroxymethylcyclohexyl)ethane, 2,2-bis(4 - hydroxymethylcyclohexyl)propane, 2,3-bis(4 - hydroxymethylcyclohexyl) - butane, 2,3-dimethyl-2,3-bis(4-hydroxymethylcyclohexyl) - butane, 1,4 - bis(4-hydroxymethylcyclohexyl)cyclohexane, and the decahydro-bis(hydroxymethyl)naphthalenes, especially the 2,6-, 2,7-, 1,4- and 1,5-isomers thereof. The various glycols may be employed in the form of pure geometrical isomers or in the form of mixtures thereof. Aralkylene glycols may also be employed, suitable examples being 1,4-bis (3-hydroxypropyl)benzene, 1,4-bis(2 - hydroxyethyl)benzene, 2,6-bis(2-hydroxyethyl)naphthalene, 1,4-bis(2-hydroxyethoxy)benzene, and bis-4-(2 - hydroxyethoxyphenyl)sulfone.

The preferred dihydroxy compounds are the dihydric phenols, suitable examples of which include hydroquinone, resorcinol, 2,2-bis(4-hydroxyphenyl)propane, 4,4'-dihydroxybiphenyl, 3,3'-dibromo-4,4'-dihydroxybiphenyl, 3,3'-difluoro-4,4'-dihydroxybiphenyl, bis(4 - hydroxyphenyl)methane, 1,1-bis(4 - hydroxyphenyl)ethane, 2,2 - bis (3,5-dichloro-4-hydroxyphenyl)propane, bis(4 - hydroxyphenyl)ether, bis(4-hydroxyphenyl)sulfone, bis(4-hydroxyphenyl)ketone, bis(4-hydroxyphenyl)sulfoxide, and 1,2-bis(4-hydroxyphenoxy)ethane.

The divalent Q radical is preferably composed primarily of carbon and hydrogen but may contain other atoms such as halogen atoms. Q may also be a chalkogen-containing radical, wherein each chalkogen atom is bonded to carbon or a different chalkogen atom, thus the repeating units may contain ether, carbonyl, sulfide, sulfoxide, or sulfonyl radicals. Mixtures of the dihydroxy compounds may be employed.

The polyesters of the invention are prepared by reacting a dihydroxy compound or an ester-forming derivative thereof, as defined and described above, with a decahydronaphthalenedicarboxylic acid or an ester-forming derivative of the acid. By an ester-forming derivative of the acid is meant a derivative of decahydronaphthalenedicarboxylic acid containing functional groups equivalent to the carboxylic acid groups in their ability to react with hydroxyl groups. Such ester-forming derivatives include its esters, particularly its esters with the lower aliphatic alcohols, with phenol, or with the glycol or dihydric phenol from which the polyester is to be formed, as well as the carbonyl halides, anhydrides, and salts of the acid.

A convenient method for forming polyesters with the cyclic glycols involves the use of an alkyl or aryl ester of the decahydronaphthalenedicarboxylic acid with an excess of the cyclic glycol from which the polyester is to be formed in an ester interchange reaction. In carrying out the ester interchange reaction, at least one molecular proportion of the cyclic glycol per molecular proportion of the decahydronapthalenedicarboxylate ester should be used, greater proportions being preferred. It is desirable to employ an ester of the decahydronaphthalenedicarboxylic acid formed from an alcohol or phenol with a boiling point considerably below that of the cyclic glycol to be used so that the former can be easily removed from the reaction zone by distillation. It is preferred to use the methyl or ethyl esters, as these esters are formed from alcohols which, because of their relatively low boiling points, are easily separated by distillation from the cyclic glycol to be used to form the desired polyester. Heating should be above the melting point of the reaction mixture and above the boiling point of the alcohol or phenol to be displaced, but not substantially above the boiling point of the glycol, although temperatures as high as 25° C. above the boiling point of the glycol may be used to hasten the completion of the reaction. Heating should be effected under conditions such that the displaced alcohol or phenol can be removed from the reaction zone, usually by means of conventional distillation equipment. The heating is usually at atmospheric pressure, but higher or lower pressures may be used if desired. The ester interchange reaction is advantageously carried out in the presence of ester interchange catalysts such as manganous acetate, calcium acetate, litharge, sodium methoxide, sodium hydrogen hexabutoxytitanate, or other suitable ester interchange catalysts as described in the literature relating to preparation of polyesters.

Following the ester interchange reaction, heating is continued under reduced pressure until the excess of the glycol is removed and the polymerization reaction has proceeded to the desired degree. The final stages of polymerization may be carried out with the polymer in the molten state or, if desired, the reaction may be completed by solid phase polymerization. The polymerization reaction may be carried out in the presence of catalysts such as antimony trioxide, litharge, zinc acetate, or other suitable polycondensation catalysts as described in the literature. Sodium hydrogen hexabutoxytitanate and the tetra-alkyl titanates such as tetraisopropyl titanate are examples of catalysts which may be used for both the ester interchange and polymerization steps.

In the preparation of the polyesters of the decahydronaphthalenedicarboxylic acids with dihydric phenols, a very suitable method is to react the decahydronaphthalenedicarboxylic acid with the diacetate of the dihydric phenol, or some other lower aliphatic ester of the dihydric phenol, at elevated temperatures in the presence of a catalyst such as sodium acetate. The reaction may be modified in various ways in accordance with known technology for forming polyesters; e.g., if desired, the dihydric phenol diacetate may be formed in situ by adding the dihydric phenol and acetic anhydride to the starting material reaction mixture. The terminal stage of the reaction may be a solid phase polymerization, as mentioned above. Other esterification methods may be employed to form the polyester with the dihydric phenol, e.g., by reacting a mixture of the dihydric phenol and a diphenyl ester of the decahydronaphthalenedicarboxylate in the presence of sodium acetate as a catalyst. Still another method is to add a solution of the acid chloride of the decahydronaphthalenedicarboxylic acid in an organic solvent such as 1,1,2-trichloroethane to a rapidly stirred solution of the dihydric phenol in aqueous sodium hydroxide.

As used herein, the term "polyester" is intended to include not only homopolyesters but also copolyesters, terpolyesters, and the like. While the preferred embodiment of the invention comprises polyesters of a decahydronaphthalenedicarboxylic acid with a dihydroxy compound of 4 to 20 carbon atoms including at least one carbocyclic nucleus, it is to be understood that the invention also comprises polyesters in which other acid residues are present. In general, at least about 80 mol percent of the acid component of the polyester should be a decahydronaphthalenedicarboxylic acid; preferably, the acid component comprises at least about 90 mol percent of a decahydronaphthalenedicarboxylic acid. By "acid component" of the polyester is meant the sum of all the carboxylic acids which would be formed by hydrolysis of the carbonyloxy linkages in the polymer chain. The remainder of the acid component of the polyester, up to about 20 mol percent of the acid component, may be any suitable dicarboxylic acid or hydroxycarboxylic acid. Examples of such compounds include 4,4'-bibenzoic acid,
2,2'- and 3,3'-dimethyl-4,4'-bibenzoic acid,
2,2'-dibromo-4,4'-bibenzoic acid,
bis(4-carboxyphenyl)methane,
1,1- and 1,2-bis(4-carboxyphenyl)ethane,
2,2'-bis(4-carboxyphenyl)propane,
1,2-bis(4-carboxyphenoxy)ethane,
bis-4-carboxyphenyl ether,
bis-4-carboxyphenyl sulfide,
bis-4-carboxyphenyl ketone,
bis-4-carboxyphenyl sulfoxide,
bis-4-carboxyphenyl sulfone,
2,8-dibenzofurandicarboxylic acid,
terephthalic acid,
methylterephthalic acid,
2,5- or 2,6-dimethylterephthalic acid,
chloroterephthalic acid,
2,5-dichloroterephthalic acid,
fluoroterephthalic acid,
isophthalic acid,
5-chloroisophthalic acid,
5-t-butylisophthalic acid,
the naphthalenedicarboxylic acids and especially the 1,4-, 1,5-, 2,6-, and 2,7-isomers,
phenylenediacetic acid,
4-carboxyphenoxyacetic acid,
m- and p-terphenyl-4,4''-dicarboxylic acid,
dodecahydrobibenzoic acid,
hexahydroterephthalic acid,
4,4'-stilbenedicarboxylic acid,
4-(2-hydroxyethyl)benzoic acid, and
4-(2-hydroxyethoxy)benzoic acid.

Hydrocarbon dicarboxylic acids or hydroxycarboxylic acids are normally preferred as copolymeric acids; however, halogen or chalkogen modifiers may also be present, as described above with respect to the dihydroxy compound. A minor amount of a dihydroxy compound or an acid component carrying a metallic sulfonate salt, carboxylate salt, phosphonate salt, or the like may also be present.

The invention therefore comprehends linear carbonyloxy polyesters which are condensation polymers of bifunctional compounds containing two functional groups selected from the class consisting of (a) hydroxyl groups and (b) carboxylic acid groups, the polyester being characterized by recurring structural units which are esters of (A) an acid component containing at least about 80 mol percent of at least one decahydronaphthalenedicarboxylic acid, and (B) a dihydroxy component containing from 4 to 20 carbon atoms, including at least one carbocyclic nucleus and free from aliphatic unsaturation. In general, for utility in forming molded articles as well as films, polyesters should have an intrinsic viscosity of at least about 0.2 and a polymer melting temperature above the boiling point of water (100° C.); preferably, the polymer melting temperature should be at least 125° C. Polyesters melting above about 200° C. and having an intrinsic viscosity of at least about 0.3 have a similar utility but are also especially advantageous for the extrusion of filaments. Up to about 325° C. the polyesters are usually melt spun, while polyesters having still higher polymer melting temperatures are usually extruded or shaped with the aid of plasticizers or solvents.

The following examples will serve to describe the preparation of typical polyesters and copolyesters of the decahydronaphthalenedicarboxylic acids. The examples are not intended to be limitative.

In the examples, "polymer melting temperature" is defined as the gross melting temperature determined by heating a polymer sample slowly and observing the lowest temperature at which a slight pressure causes permanent deformation of the sample.

The term "intrinsic viscosity," as used herein, is defined as the limit of the fraction $$\frac{\ln(r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

EXAMPLE 1

*Preparation of dimethyl decahydronaphthalenedicarboxylates and the decahydronaphthalenedicarboxylic acids*

(A) DIMETHYL DECAHYDRO-2,6-NAPHTHALENE-DICARBOXYLATE

To a solution of 200 g. of dimethyl 2,6-naphthalenedicarboxylate in 800 cc. of cyclohexane is added 9 g. of finely-divided ruthenium on carbon, after which the mixture is hydrogenated for 6 hours at 150° C. under an atmosphere of 1800 p.s.i. of hydrogen. The solution is then worked up by fractional distillation through a 36-inch column, taking the center cut (over 90% of the distillate) at 138–140° C. (0.2 mm. of mercury) as the desired product, dimethyl decahydro-2,6-naphthalenedicarboxylate. The ester has a melting point of 42–56° C. and a saponification equivalent of 127.7 (theoretical 127.1). Vapor phase chromatography of a sample establishes that the ester is a mixture of geometrical isomers.

(B) OTHER DIMETHYL DECAHYDRONAPHTHALENE-DICARBOXYLATES

The following dimethyl decahydronaphthalenedicarboxylates are produced by repeating the procedure of part (A), in each instance hydrogenating the appropriate position isomer of dimethyl naphthalenedicarboxylate over ruthenium on carbon to produce the corresponding position isomer of dimethyl decahydronaphthalenedicarboxylate:

Dimethyl decahydro-1,2-naphthalenedicarboxylate
Dimethyl decahydro-1,3-naphthalenedicarboxylate
Dimethyl decahydro-1,4-naphthalenedicarboxylate
Dimethyl decahydro-1,5-naphthalenedicarboxylate
Dimethyl decahydro-1,6-naphthalenedicarboxylate
Dimethyl decahydro-1,7-naphthalenedicarboxylate
Dimethyl decahydro-1,8-naphthalenedicarboxylate
Dimethyl decahydro-2,3-naphthalenedicarboxylate
Dimethyl decahydro-2,7-naphthalenedicarboxylate (C) HIGH MELTING GEOMETRICAL ISOMER OF DIMETHYL DECAHYDRO-2,6-NAPHTHALENEDICARBOXYLATE 100 grams of the mixture of geometrical isomers of dimethyl decahydro-2,6-naphthalenedicarboxylate, prepared as described in part (A) above, is dissolved in 1 liter of a mixture of 80 parts by volume of water and 20 parts by volume of ethanol. To the solution is added 33 g. of sodium hydroxide, after which it is refluxed overnight and the ethanol is distilled off. When the solution is acidified with dilute hydrochloric acid, a precipitate forms which is filtered off, washed with distilled water, and dried. The product, decahydro-2,6-naphthalenedicarboxylic acid (mixed geometrical isomers), amounts to 86 g. and has a melting point of 210–222° C.

The acid is isomerized by placing it in a container under a vacuum of 15 mm. of mercury and heating for one hour at 200° C., one hour at 250° C., and finally for one hour at 300° C. The isomerized acid remains solid when heated to 330° C.

A solution of 13 g. of the isomerized acid is treated with an excess of diazomethane in ether, after which the ether is evaporated. When a sample of the resulting dimethyl ester is subjected to vapor phase chromatography, nearly all of the material is found in a single peak and it is concluded that 95% of the product is in the form of single geometric isomer of dimethyl decahydro-2,6-naphthalenedicarboxylate. The dimethyl ester is recrystallized from a solvent comprising equal parts of methanol and pentane. The recrystallized product melts at 80–82° C. and vapor phase chromatography of a sample establishes that all of the material passes through a single peak, indicating that the material is a pure geometrical isomer. The peak is identical with the peak of greatest retention time observed in the vapor phase chromatographic analysis of the mixed geometrical isomers of part (A).

(D) THE DECAHYDRONAPHTHALENEDI-CARBOXYLIC ACIDS

The various decahydronaphthalenedicarboxylic acids are prepared by saponifying the ester products of part (B) with sodium hydroxide in accordance with the procedure described in part (C) for the preparation of decahydro-2,6-naphthalenedicarboxylic acid.

EXAMPLE 2

*Polyesters with 2,2-bis(4-hydroxyphenyl)propane*

(A) POLY(ISOPROPYLIDENE-4,4'-DIPHENYLENE DECAHYDRO-2,6-NAPHTHALENEDICARBOXYLATE)

A charge consisting of 8.99 g. (0.0398 mol) of the mixed geometrical isomers of decahydro-2,6-naphthalenedicarboxylic acid of part (C) of Example 1 (M.P. 210–222° C.), 12.4 g. (0.0398 mol) of diphenylolpropane diacetate, and 0.1 g. (0.0012 mol) of sodium acetate catalyst is placed in a polymer tube fitted with a nitrogen inlet. The tube is swept out with nitrogen and then heated to 250° C. to melt the contents. Evolution of acetic acid begins almost immediately after the ingredients become molten and is continued under a constant stream of nitrogen until about 80–90% of the theoretical amount of acetic acid is distilled out, which requires about 1 hour. The tube is then cooled and the polymer removed.

The polymeric material prepared as described is powdered and then heated for 4 hours under a stream of nitrogen at a pressure of 0.5 mm. of mercury while the temperature is gradually increased from 175° C. to 250° C. At the conclusion of this solid phase polymerization reaction, the intrinsic viscosity of the polymer is 0.99 and the polymer melting temperature is 260° C. The polymer is identified as poly(isopropylidine-4,4'-diphenylene decahydro-2,6-naphthalenedicarboxylate) and forms fibers and films which are tough and flexible after orientation.

(B) POLY(ISOPROPYLIDENE-4,4'-DIPHENYLENE DECAHYDRO-2,7-NAPHTHALENEDICARBOXYLATE

The procedure described above is repeated, substituting decahydro-2,7-naphthalenedicarboxylic acid (mixed geometrical isomers) for the decahydro-2,6-naphthalenedicarboxylic acid. The intrinsic viscosity of the resulting poly (isopropylidene-4,4'-diphenylene decahydro-2,7-naphthalenedicarboxylate) is 0.4 and the polymer melting temperature is 230° C. Flexible films are formed by melt-pressing the polymer.

(C) OTHER DIPHENYLOLPROPANE POLYESTERS

By substituting other position isomers of decahydronaphthalenedicarboxylic acid as obtained from part (D) of Example 1 for the decahydro-2,6-naphthalenedicarboxylic acid in the procedure described above, the following polymers are prepared:

Poly(isopylidene-4,4'-diphenylene decahydro-1,2-naphthalenedicarboxylate),
Poly(isopropylidene-4,4'-diphenylene decahydro-1,3-naphthalenedicarboxylate),
Poly(isopropylidene-4,4'-diphenylene decahydro-1,4-naphthalenedicarboxylate),
Poly(isopropylidene-4,4'-diphenylene decahydro-1,5-naphthalenedicarboxylate),
Poly(isopropylidene-4,4'-diphenylene decahydro-1,6-naphthalenedicarboxylate),
Poly(isopropylidene-4,4'-diphenylene decahydro-1,7-naphthalenedicarboxylate),
Poly(isopropylidene-4,4'-diphenylene decahydro-1,8-naphthalenedicarboxylate), and
Poly(isopropylidene-4,4'-diphenylene decahydro-2,3-naphthalenedicarboxylate).

When the procedure is repeated again, employed as the acid starting material a mixture of 92 mol percent decahydro-2,6-naphthalenedicarboxylic acid and 8% of the 2,7- acid, the corresponding copolyester is produced.

Flexible films of each of the above polymers are prepared by melt-pressing the polymer.

EXAMPLE 3

Poly(1,4-phenylene decahydro-2,6-naphthalenedicarboxylate)

A charge consisting of 5.0 g. (0.022 mol) of decahydro-2,6-naphthalenedicarboxylic acid (M.P. 210–222° C.), 4.3 g. (0.022 mol) of hydroquinone diacetate, and 0.01 g. (0.00012 mol) of sodium acetate catalyst is placed in a polymer tube fitted with a nitrogen inlet. The tube is swept out with nitrogen and then heated to 250° C. to melt the contents. Evolution of acetic acid begins almost immediately after the ingredients become molten and is continued under a constant stream of nitrogen until about 90% of the theoretical amount of acetic acid is distilled out, which requires about 1 hour. The tube is then cooled and the polymer removed. The polymer is identified as poly(1,4-phenylene decahydro-2,6-naphthalenedicarboxylate); the intrinsic viscosity of the polymer is 0.24 and the polymer melting temperature is 235° C.

The polymeric material prepared as described above is powdered and then heated for 8 hours under a stream of nitrogen at a pressure of 0.5 mm. of mercury while the temperature is gradually increased from 185° C. to 220° C. At the conclusion of this solid phase polymerization reaction, the intrinsic viscosity of the polymer is 0.4 and the polymer remains solid when heated to 330° C. The polymer forms fibers and films which are tough and flexible after orientation.

EXAMPLE 4

Poly(4,4'-biphenylene decahydro-2,6-naphthalenedicarboxylate)

A charge consisting of 2.0 g. (0.009 mol) of decahydro-2,6-naphthalenedicarboxylic acid (M.P. 210–222° C.), 1.72 g. (0.009 mol) of resorcinol diacetate, and 0.01 g. (0.00012 mol) of sodium acetate catalyst is placed in a polymer tube fitted with a nitrogen inlet. The tube is swept out with nitrogen and then heated to 250° C. to melt the contents. Evolution of acetic acid begins almost immediately after the ingredients become molten and is continued under a constant stream of nitrogen until about 90% of the theoretical amount of acetic acid is distilled out, which requires about 1 hour. The tube is then cooled and the polymer removed. The polyester is identified as poly(1,3-phenylene decahydro-2,6-naphthalenedicarboxylate) having an intrinsic viscosity of 0.3 and a polymer melting temperature of 160° C. The polymer forms films which are tough and flexible after orientation.

EXAMPLE 5

Poly(4,4'-biphenylene decahydro-2,6-naphthalenedicarboxylate)

A charge consisting of 4.0 g. (0.018 mol) of decahydro-2,6-naphthalenedicarboxylic acid (M.P. 210–222° C.), 4.78 g. (0.018 mol) of 4,4'-bisphenol diacetate, and 0.1 g. (0.0012 mol) of sodium acetate catalyst is placed in a polymer tube. The tube is swept out with nitrogen and then heated to 250° C. to melt the contents. Evolution of acetic acid begins almost immediately after the ingredients become molten and is continued under a constant stream of nitrogen until about 90% of the theoretical amount of acetic acid is distilled out, which requires about 1 hour. The tube is then cooled and the polymer removed. The intrinsic viscosity of the polymer is 0.6. The polymer is identified as poly(4,4'-biphenylene decahydro-2,6-naphthalenedicarboxylate) and remains solid when heated to 350° C.

EXAMPLE 6

Polyester from decahydro - 2,6 - naphthalenedicarboxylic acid, hydroquinone (50%), and diphenylolpropane (50%)

A charge consisting of 23 g. (0.1 mol) of decahydro-2,6-naphthalenedicarboxylic acid (M.P. 210–222° C.), 15.6 g. (0.05 mol) of diphenylolpropane diacetate, 9.7 g. (0.05 mol) of hydroquinone diacetate, and 0.16 g. (0.002 mol) of sodium acetate catalyst is placed in a reaction flask fitted with a nitrogen inlet, stirrer, distilling head, and heating bath. The apparatus is swept out with nitrogen and then heated to 250° C. to melt the contents. Evolution of acetic acid begins almost immediately after the ingredients become molten and is continued under a constant stream of nitrogen until about 90% of the theoretical amount of acetic acid is distilled out, which requires about 1 hour. The flask is then removed from the bath, cooled, and the polymer removed. The intrinsic viscosity of the polymer is 0.44 and the polymer melting temperature is 235° C. The polymer forms fibers and films which are tough and flexible after orientation.

EXAMPLE 7

*Polyester from decahydro-2,6-naphthalenedicarboxylic acid, hydroquinone (60%), and diphenylolpropane (40%)*

A charge consisting of 2.0 g. (0.0088 mol) of decahydro-2,6-naphthalenedicarboxylic acid (M.P. 210–222° C.), 1.1 g. (0.0035 mol) of diphenylolpropane diacetate, 1.03 g. (0.0053 mol) of hydroquinone diacetate, and 0.1 g. (0.0012 mol) of sodium acetate catalyst is placed in a polymer tube. The tube is swept out with nitrogen and then heated to 250° C. to melt the contents. Evolution of acetic acid begins almost immediately after the ingredients become molten and is continued under a constant stream of nitrogen until about 90% of the theoretical amount of acetic acid is distilled out, which requires about 1 hour. The tube is then cooled and the polymer removed. The intrinsic viscosity of the polymer is 0.4 and the polymer melting temperature is 260° C. The polymer forms fibers and films which are tough and flexible after orientation.

EXAMPLE 8

*Poly(hexahydro-p-xylylene decahydro-2,6-naphthalenedicarboxylate)*

Into a small polymer tube is placed 12.5 g. (0.05 mol) of dimethyl decahydro-2,6-naphthalenedicarboxylate prepared as described in part (A) of Example 1; 15.6 g. (0.11 mol) of hexahydro-p-xylylene glycol; and, as a catalyst, 5 drops of a solution of 16 g. of sodium hydrogen hexabutoxytitanate, $NaHTi(OBu)_6$, in 200 cc. of n-butanol. The ingredients are melted and a capillary for nitrogen flow is inserted into the polymer tube. Ester exchange is carried out for 2 hours at 220–230° C., after which the temperature is raised to 275° C. and vacuum is applied gradually until the pressure is reduced to 0.5 mm. of mercury. After 4 hours of polymerization at this temperature and pressure with a continuous slow stream of nitrogen maintained through the tube, a clear white solid polymer is produced. Flexible films are produced by melt-pressing the polymer.

EXAMPLE 9

*Copolyester fibers and films of improved dyeability with basic dyes*

The procedure of Example 8 is repeated, substituting in place of the dimethyl decahydro-2,6-naphthalenedicarboxylate a mixture of 12.25 g. (0.049 mol) of dimethyl decahydro-2,6-naphthalenedicarboxylate and 0.30 g. (0.001 mol) of sodium 3,5-di(carbomethoxy)benzenesulfonate. The product, poly[hexahydro-p-xylylene decahydro-2,6-naphthalenedicarboxylate/5-(sodium sulfo)isophthalate], 98/2 mol percent, forms flexible films via conventional melt-pressing procedure. The films so formed exhibit greatly enhanced dyeability with Fuchsine SBP dye (C.I. 42,510) and other basic dyes as contrasted with the corresponding homopolyester of Example 8, which has virtually no affinity for these basic dyes. Fibers produced from the copolyester by melt extrusion are also readily dyeable with Fuchsine SBP dye.

EXAMPLE 10

*Polyester from hexahydro-p-xylylene glycol, decahydro-2,6-naphthalenedicarboxylic acid (80%) and bibenzoic acid (20%)*

The procedure of Example 8 is repeated, substituting in place of the dimethyl decahydro-2,6-naphthalenedicarboxylate a mixture of 10.0 g. (0.04 mol) of dimethyl decahydro-2,6-naphthalenedicarboxylate and 2.68 g. (0.01 mol) of dimethyl 4,4'-bibenzoate. The product, poly(hexahydro-p-xylylene decahydro-2,6-naphthalenedicarboxylate/4,4'-bibenzoate), 80/20 mol percent, is a clear solid having a polymer melting temperature of 140° C. and an intrinsic viscosity of 0.55.

EXAMPLE 11

*Poly(bicyclohexyl-4,4'-dimethylene decahydro-2,6-naphthalenedicarboxylate)*

Fifty-one g. of trans-, trans-dimethyl dodecahydro-4,4'-bibenzoate is dissolved in 500 cc. of ether and the solution is added dropwise to a refluxing slurry of 20 g. of lithium aluminum hydride in 500 cc. of ether. After the addition is complete, the mixture is refluxed for 24 hours. Excess hydride is then destroyed with 100 cc. of ethyl acetate added drop by drop, after which the mixture is cooled to −20° C. Seventy-five cc. of concentrated sulfuric acid is diluted with 200 cc. of water and the mixture is added dropwise. After allowing the mixture to warm to room temperature, enough water is added to give a sludge and an easily decanted ether layer. The aqueous layer is extracted with ether and the combined ether extracts are evaporated, after which the resulting glycol is recrystallized from aqueous ethanol. The product, trans-, trans-bis(4-hydroxymethylcyclohexyl), has a melting point of 184° C.

Into a small polymer tube is placed 7.2 g. (0.032 mol) of trans-, trans-bis(4-hydroxymethylcyclohexyl); 4.0 g. (0.016 mol) of dimethyl decahydro-2,6-naphthalenedicarboxylate (M.P. 80–82° C.), prepared as described in part (C) of Example 1; and 3 drops of a solution of 16 g. of $NaHTi(OBu)_6$ in 200 cc. of n-butanol as a catalyst. The ingredients are melted and a capillary for nitrogen flow is inserted into the polymer tube. Ester exchange is carried out for 2 hours at 220–230° C., after which the temperature is raised to 275° C. and vacuum is applied gradually until the pressure is reduced to 0.5 mm. of mercury. After 4 hours of polymerization at this temperature and pressure with a continuous slow stream of nitrogen maintained through the tube, a polymer having an intrinsic viscosity of 0.4 and a polymer melting temperature of 125° C. is produced.

EXAMPLE 12

*Poly(ethylene decahydro-2,6-naphthalenedicarboxylate) (a comparison example)*

Into a small polymer tube is placed 12.5 g. (0.05 mol) of dimethyl decahydro-2,6-naphthalenedicarboxylate, prepared as described in part (A) of Example 1; 6.83 g. (0.11 mol) of ethylene glycol; and 5 drops of a solution of 16 g. of $NaHTi(OBu)_6$ in 200 cc. of n-butanol as a catalyst. The ingredients are melted and a capillary for nitrogen flow is inserted into the polymer tube. Ester exchange is carried out for 2 hours at 150–230° C., after which the temperature is raised to 275° C. and vacuum is applied gradually until the pressure is reduced to 0.5 mm. of mercury. After 4 hours of polymerization at this temperature and pressure with a continuous slow stream of nitrogen maintained through the tube, a polymer having an intrinsic viscosity of 0.43 and a polymer melting temperature of 75° C. is produced.

This is illustrative of the low melting character of polyesters prepared from decahydronaphthalenedicarboxylates with acyclic dihydroxy compounds.

Since many different embodiments of the invention may be made without departing from the spirit and scope thereof, it is to be understood that the invention is not limited by the specific illustrations except to the extent defined in the following claims.

I claim:

1. A fiber-forming linear polyester of decahydronaphthalenedicarboxylic acid, at least 80 mol percent of the recurrent units being represented by the general formula

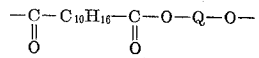

wherein —Q— is a divalent radical selected from the group consisting of 1,4-phenylene, 2,2-bis(4-phenylene)propane, 4,4'-biphenylene, bis(4-phenylene)methane, 1,1-bis(4-phenylene)ethane and 1,2-bis(4-phenyleneoxy)ethane, the polyester being free from aliphatic unsaturation, melting above about 200° C. and having an intrinsic viscosity of at least about 0.3 as determined in trifluoroacetic acid/methylene chloride (1:3) solvent at 25° C.

2. A polyester as defined in claim 1 wherein

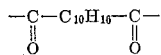

is a decahydronaphthalenedicarbonyl group having the two carbonyl components separated by a chain of at least four nuclear alicyclic carbon atoms.

3. A polyester as defined in claim 1 wherein the carbonyl components

are symmetrically substituted on the decahydronaphthalene groups (—$C_{10}H_{16}$—).

4. A polyester as defined in claim 1 and identified as poly(isopropylidene-4,4'-diphenylene decahydro-2,6-naphthalenedicarboxylate).

5. A polyester as defined in claim 1 and identified as poly(1,4-phenylene decahydro-2,6-naphthalenedicarboxylate).

6. A polyester as defined in claim 1 and identified as poly(4,4' - biphenylene decahydro - 2,6 - naphthalenedicarboxylate).

7. A fiber-forming linear polyester of decahydronaphthalenedicarboxylic acid, at least 80 mol percent of the polyester being a copolyester of decahydro-2,6-naphthalenedicarboxylic acid and a mixture of hydroquinone and diphenylolpropane, the polyester being free from aliphatic unsaturation, melting above about 200° C. and having an intrinsic viscosity of at least about 0.3 as determined in trifluoroacetic acid/methylene chloride (1:3) solvent at 25° C.

8. Fibers of the polyester defined in claim 1.
9. Films of the polyester defined in claim 1.

References Cited by the Examiner
UNITED STATES PATENTS

| | | | |
|---|---|---|---|
| 2,035,578 | 3/1936 | Wagner | 260—2 |
| 2,595,343 | 5/1952 | Drewitt et al. | 260—47 |
| 2,901,466 | 8/1959 | Kibler et al. | 260—75 |
| 3,007,900 | 11/1961 | Lytton et al. | 260—75 |

WILLIAM H. SHORT, *Primary Examiner.*

LOUISE P. QUAST, *Examiner.*